United States Patent [19]
Kamioka

[11] Patent Number: 6,163,333
[45] Date of Patent: Dec. 19, 2000

[54] MULTI-BEAM SCANNING OPTICAL APPARATUS

[75] Inventor: Makoto Kamioka, Kasuga, Japan

[73] Assignee: Matsushita Electric Industrial Co., Ltd., Osaka, Japan

[21] Appl. No.: 09/276,766

[22] Filed: Mar. 26, 1999

[30] Foreign Application Priority Data

Mar. 27, 1998 [JP] Japan .................................. 10-080857
Nov. 4, 1998 [JP] Japan .................................. 10-312920

[51] Int. Cl.$^7$ ...................................................... B41J 27/00
[52] U.S. Cl. .......................... 347/241; 347/233; 347/256; 250/227.26
[58] Field of Search .................................. 347/233, 234, 347/241, 242, 243, 244, 256; 250/227.2, 227.26, 236; 359/419, 363

[56] References Cited

U.S. PATENT DOCUMENTS 5,786,594  7/1998  Ito et al. .................................. 250/236
5,805,199  9/1998  Aoki .......................................... 347/256

Primary Examiner—N. Le
Assistant Examiner—Hai C. Pham
Attorney, Agent, or Firm—McDermott, Will & Emery

[57] ABSTRACT

A multi-beam scanning optical apparatus employs a beam pitch adjusting system in which the position of a first beam is detected by using a beam position detecting system composed of a knife edge shaped plate and one photo sensor, and in which the optical path of the second beam is corrected so that the position of the second beam may be at a specified distance from the position of the first beam. A further embodiment of the beam pitch adjusting systems includes a beam position detecting system using a line position sensor by CCD or PSD. A yet further embodiment of the beam pitch adjusting system includes a position detecting system utilizing the power of a beam efficiently by disposing a focusing lens on an optical path of the beam. Hence, beam pitch adjustment is facilitated, the pitch adjustment precision is enhanced, the range of pitch adjustment is optimized, the number of parts is reduced, and space is saved.

8 Claims, 15 Drawing Sheets

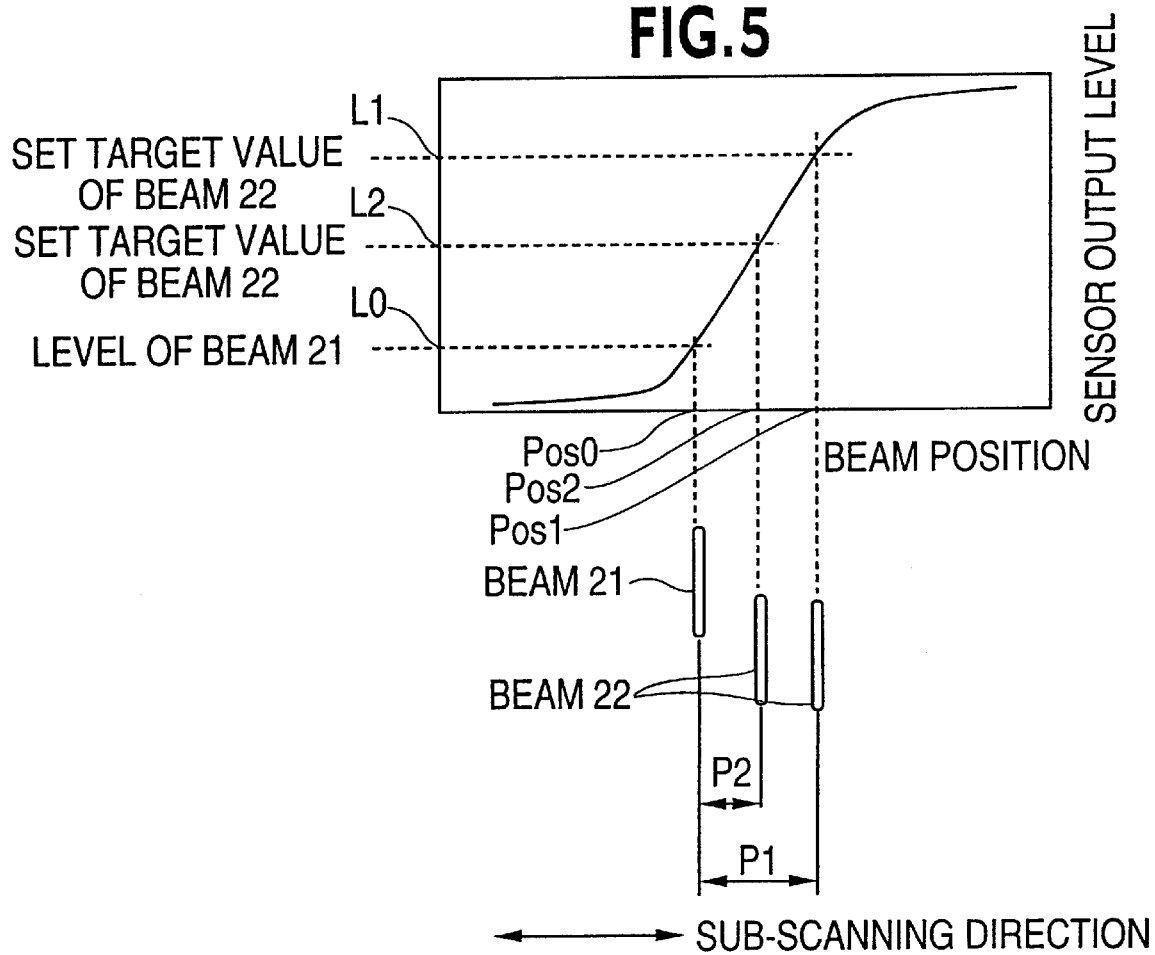

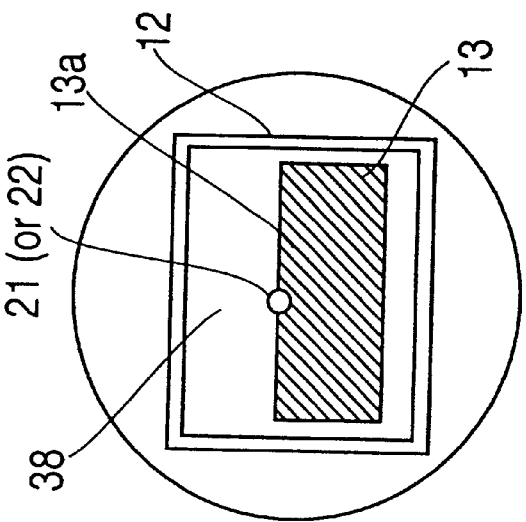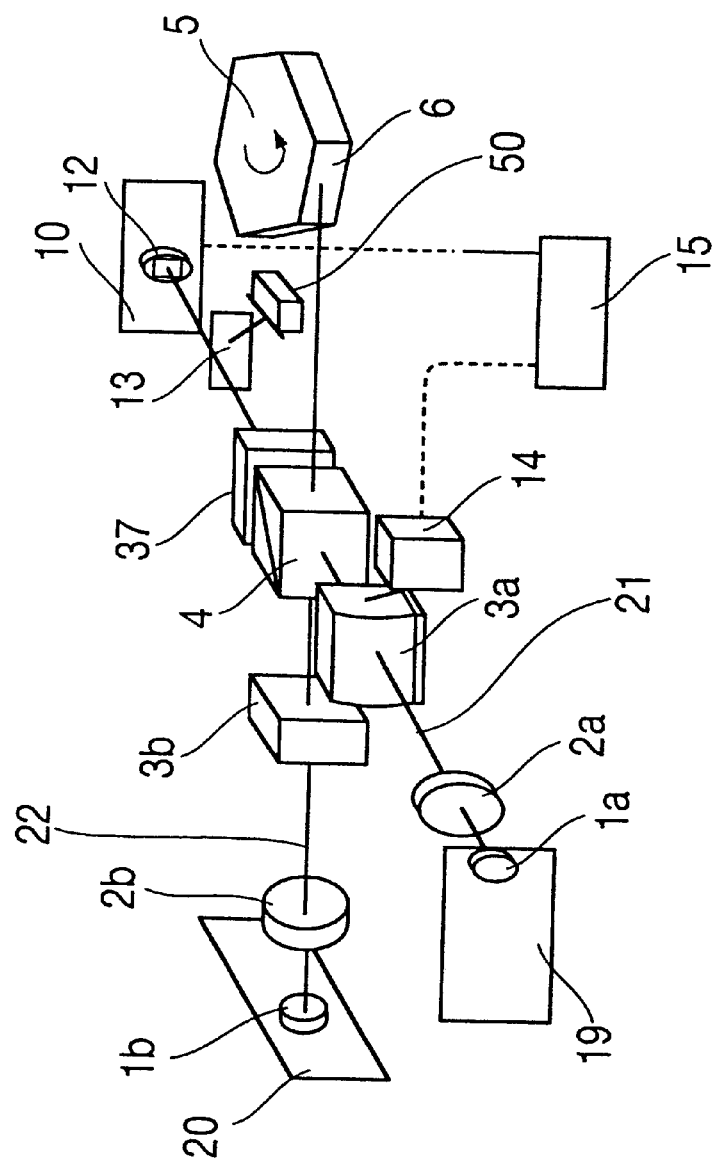
FIG. 7(b)
FIG. 7(a)

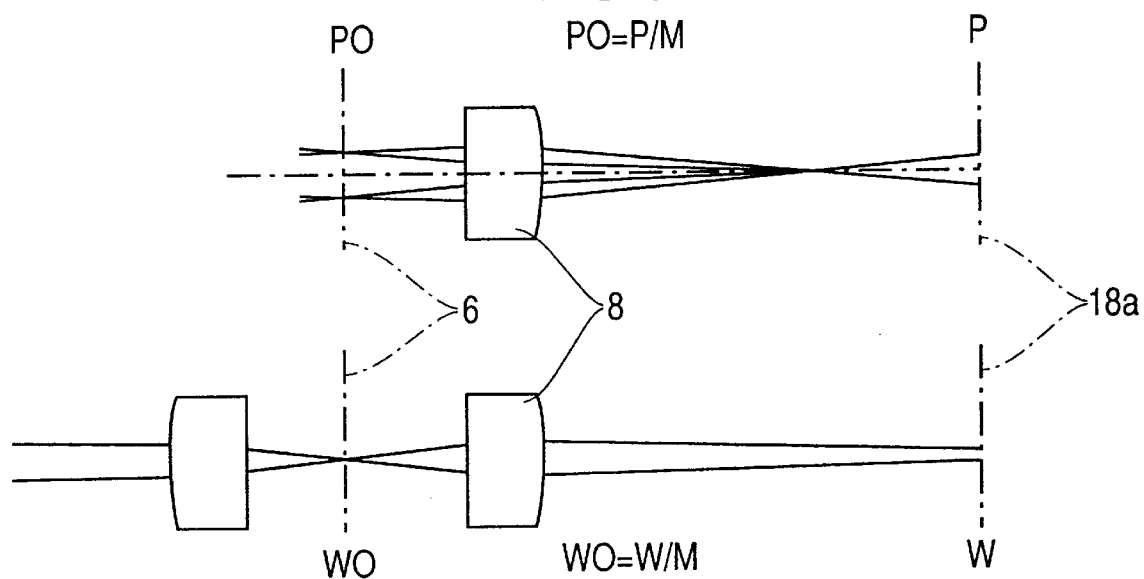

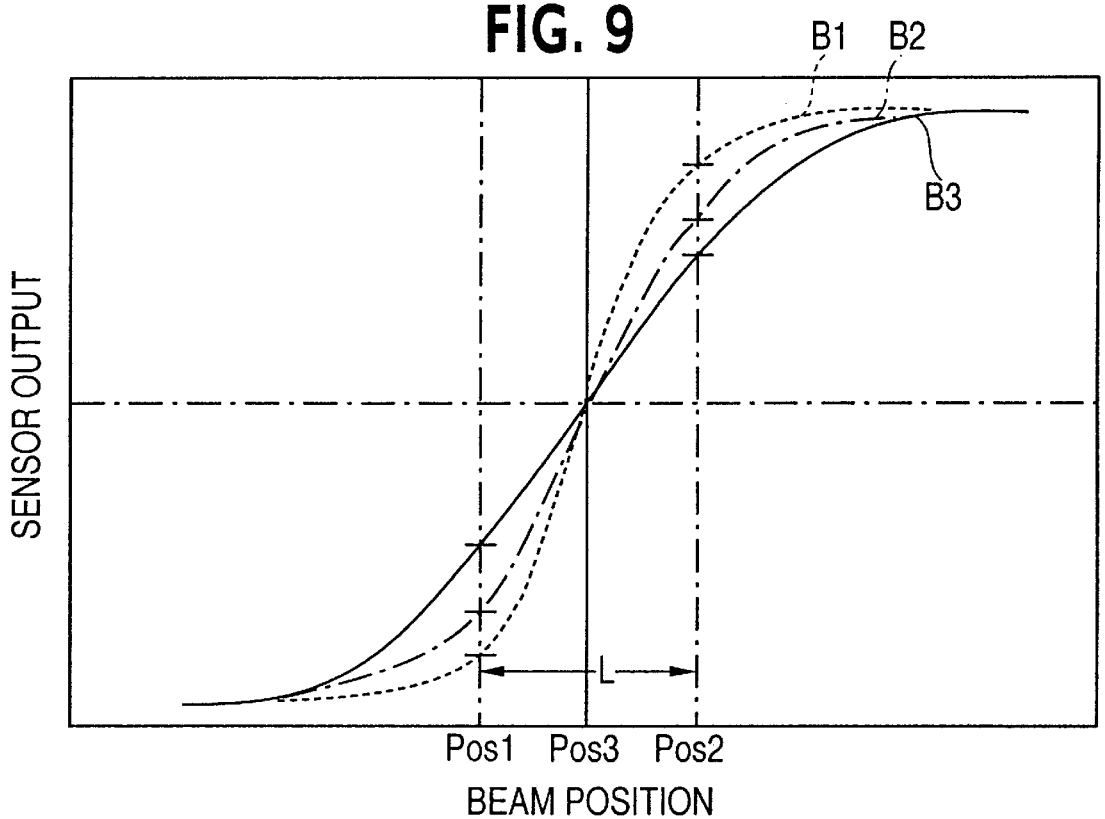

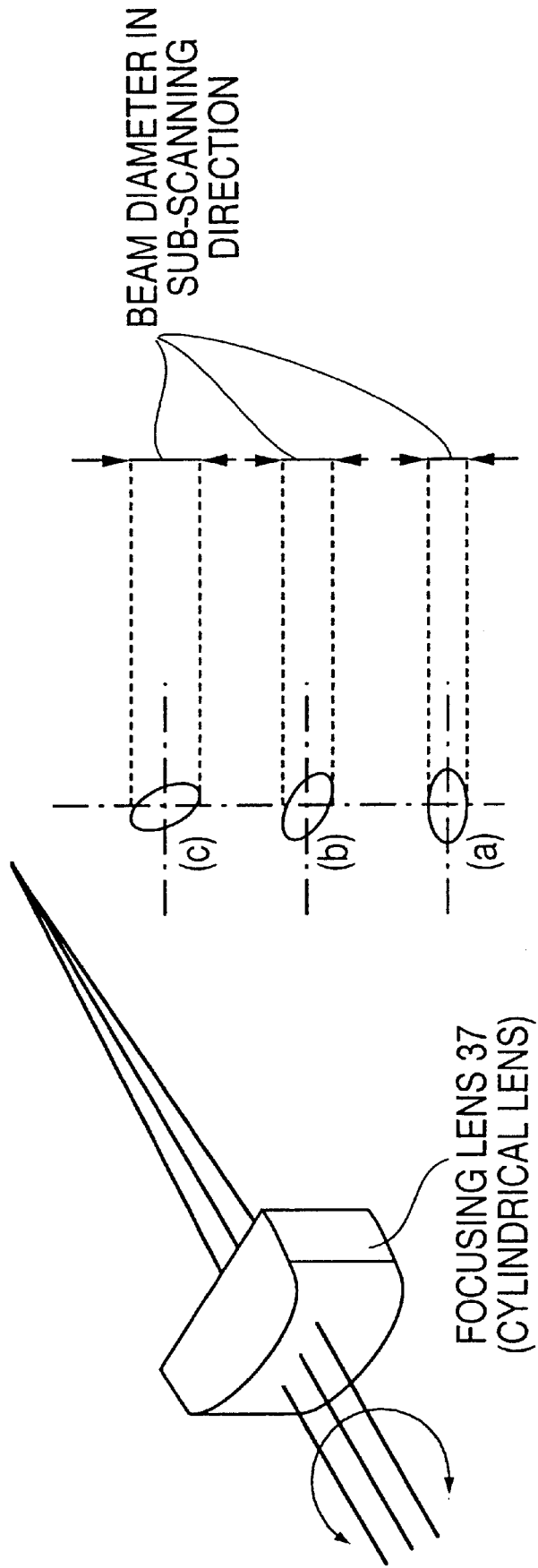

IMAGE OF SPECIFIED BEAM PITCH

IMAGE OF DEVIATED BEAM PITCH

MULTI-BEAM SCANNING OPTICAL APPARATUS

FIELD OF THE INVENTION

The present invention relates to a multi-beam scanning optical apparatus, such as electrophotographic apparatus, for forming images by scanning beams.

BACKGROUND OF THE INVENTION

Hitherto, the beam scanning optical apparatus has been used image writing in electrophotographic process, and installed in laser beam printer, laser facsimile device and other output devices of computer, facsimile apparatus, and others. Recently, higher speed and higher resolution are required, and there is a mounting demand for multi-beam scanning optical apparatus using plural beams in order to enhance the speed and resolution further.

A prior art of multi-beam scanning optical apparatus for scanning multiple beams is described.

First, the constitution is explained.

As shown in FIG. 12(a), it comprises a drive circuit 23 for emitting a beam 21 by driving a first light source 1a, and a drive circuit 24 for emitting a beam 22 by driving a second light source 1b. As the beam 21 from the first light source 1a and the beam 22 from the second light source 1b are emitted, an electrostatic latent image is formed on a scanning surface 18a of a uniformly charged photosensitive drum 18. A collimator lens 2a is provided in correspondence to the first light source 1a, and a collimator lens 2b, to the second light source 1b, and the beams 21, 22 from the light sources 1a, 1b are transformed into coherent beams by these collimator lenses 2a, 2b.

On optical paths of the beams 21, 22 passing through the collimator lenses 2a, 2b, prisms 39a, 39b for adjusting the pitch of the beams 21, 22 in the sub-scanning direction, and a beam splitter 4 for adjusting the optical axes of the beams 21, 22 are disposed. Corresponding to these prisms 39a, 39b, respectively, there are optical path correcting means 40a, 40b for adjusting the beam pitch to a specified interval by rotating the prisms 39a, 39b and varying the beam positions of the beams 21, 22 in the sub-scanning direction.

Moreover, on optical paths of the beams 21, 22 from the beam splitter 4 to the photosensitive drum 18, there are disposed a cylindrical lens 41 for focusing the beams 21, 22 in the sub-scanning direction, a deflector 5 having a deflecting surface 6 near the focusing point of the cylindrical lens 41 for deflecting the two beams 21, 22 simultaneously, a scanning lens system 8 for focusing the beams 21, 22 deflected by the deflector 5 on the scanning surface 18a of the photosensitive drum 18, and a mirror 26 for leading the beams 21, 22 up to the scanning surface 18a.

At a position on the optical path of the beams 21, 22 emitted from the beam splitter 4 in a different direction from the deflecting surface 6, a sensor unit 10 is disposed for detecting the pitch interval of the beams 21, 22 in the sub-scanning direction. A magnified view of this sensor unit 10 as seen from the incident direction of the beam is shown in FIG. 12(b), and it is composed of a two-division sensor 35 for detecting the position of the beam 21, and a two-division sensor 36 for detecting the position of the beam 22. The beams 21, 22 are adjusted in position by the prisms 39a, 39b so as to be emitted to the boundary of the corresponding two-division sensors, that is, between a detecting surface 27 and a detecting surface 28 of the two-division sensor 35, and between a detecting surface 29 and a detecting surface 30 of the two-division sensor 36. The two-division sensors 35 and 36 are fixed as being mutually deviated in the sub-scanning direction so as to form a specified beam pitch on the scanning surface 18a.

To control scan timing of the beams 21, 22 scanned by the deflector 5 in the main scanning direction, a synchronism detector 9 is disposed. By this synchronism detector 9, the beams 21, 22 modulated with the intensity corresponding to the image data are emitted by the drive circuits 23, 24 of the light sources 1a, 1b at the timing of specified time. Moreover, a control circuit 17 is provided to rotate the prism 39a on the basis of the signal from the sensor unit 10, and control the beam position of the beam 21 in the sub-scanning direction. Other members than the photosensitive drum 18 are accommodated in a housing 16.

In thus structured multi-beam scanning optical apparatus, the operation is described below, mainly relating to the operation of pitch adjustment of two beams.

First, in order to obtain a favorable image, it is important to maintain the beam pitch always in normal state, which is described while referring to FIGS. 13(a) and 13(b).

FIG. 13(a) shows an image when the beam pitch is adjusted to a specified value, and FIG. 13(b) shows an image when not adjusted to a specified value. When the beam pitch is not adjusted correctly as shown in FIG. 13(b), the beam scanning line interval includes narrow portions and wide portions, and the image is deteriorated extremely. When assembling such multi-beam scanning optical apparatus, the beam pitch must be fixed after adjusting to a specified value, but actually it is hard to keep the beam pitch precisely for a long period due to aging and environmental changes.

Thus, in the multi-beam scanning optical apparatus, it is an important matter to keep the interval of two beams 21, 22 scanned simultaneously at tens of microns in the sub-scanning directions, and this scanning apparatus includes means for achieving this. This is because it is required to correct the beam pitch after assembling, if the two beams 21, 22 are adjusted to a specified beam pitch at the time of assembling the optical system, as the beam pitch is likely to deviate due to aging effects, deformation or distortion of the unit after installation of the apparatus.

The beams 21 and 22 emitted from the first light source 1a and second light source 1b in FIG. 12(a) are adjusted to coherent beams by the collimator lenses 2a and 2b. Consequently, the beams 21 and 22 are changed in their optical path by the prisms 39a, 39b, respectively, and the pitch in the sub-scanning direction is adjusted to a specified interval.

The beams 21, 22 passing through the prisms 39a, 39b are adjusted of their optical axes by the beam splitter 4, and focused in the sub-scanning direction by the cylindrical lens 41. Under the condition of keeping an optical conjugate relation between the deflecting surface 6 and scanning surface 18a, such focusing is effective to alleviate the effect of surface tilting which is slightly inclined in each deflecting surface 6 of a deflector 5. Since the deflecting surface 6 and the scanning surface 18a are in a conjugate relation in the sub-scanning direction, the beam pitch on the deflecting surface 6 are projected on the scanning surface 18a at a multiplying factor of the scanning lens system 8 in the sub-scanning direction. Therefore, the beam pitch can be controlled on the deflecting surface 6, and the beam pitch on the scanning surface 18a can be maintained in a correct state.

Positioning of the beams 21 and 22 in the sub-scanning direction is described below.

When positioning the beam 21 by using the two-division sensor of the sensor unit 10 as shown in FIG. 12(b), first, only the first light source 1a is driven by the drive circuit 23, and the beam 21 is emitted to the two-division sensor 35. At this time, the control circuit 17 adjusts the optical path of the beam 21 in the sub-scanning direction by rotating the prism 39a so that the output to the quantity of light of the detecting surface 27 and the output to the quantity of light of the detecting surface 28 may be at a same level.

Herein, FIGS. 14(a), 14(b) and 14(c) show the relation between the beam position and the output from the detecting surface in adjustment of beam position by using the two-division sensor.

As shown in FIG. 14(a), when the beam 21 is deviated to the detecting surface 27 side, the output level from the detecting surface 27 is higher than that from the detecting surface 28, and the output difference between the detecting surface 28 and the detecting surface 27 based on the detecting surface 28 appears as a positive value. To the contrary, as shown in FIG. 14(c), when the beam 21 is deviated to the detecting surface 28 side, the output level of the detecting surface 28 is higher than that of the detecting surface 27, and the output difference between the detecting surface 28 and the detecting surface 27 based on the detecting surface 28 appears as a negative value. Therefore, moving direction from the present beam position moving direction can be judged from the output level difference between the detecting surfaces 27, 28, so that the prism 39a is rotated while controlling the optical path correcting means 40a by the control circuit 17.

Change of optical path by the prism 39a is achieved by shifting the angle of the prism 39a in the sub-scanning direction, and changing the position of the beam 21 in the sub-scanning direction on the deflecting surface 6. Accordingly, as shown in FIG. 14(b), when the output levels of the detecting surface 27 and detecting surface 28 become same, rotation of the prism 39a is stopped. At this time, the center of the beam 21 is adjusted to the boundary of the detecting surfaces 27, 28. Thus, by rotating the prism 39a, the position of the beam 21 from the first light source 1a can be corrected to a specified position.

Similarly, the beam 22 is adjusted to the boundary of the detecting surfaces 29, 30 of the two-division sensor 36 by the same operation as in optical path correction of the beam 21.

Since the two-division sensor 35 having the detecting surfaces 27, 28 and the two-division sensor 36 having the detecting surfaces 29, 30 are fixed in a state being deviated in the sub-scanning direction by a specified extent (the pitch extent on the scanning surface 18a), by adjusting each beam to the boundary of each two-division sensor as described above, the two beams 21, 22 scanning the scanning surface 18a are controlled to an adequate interval.

Such optical path correction for adjusting the beam pitch of the beams 21, 22 is conducted before the beams 21, 22 are emitted to form an image on the scanning surface 18a. For example, when this beam scanning apparatus is used in writing of laser printer, said correction is conducted within the stabilizing time of rotation of the deflector 5 after input of print start signal.

After optical path correction of the two beams 21, 22, when the beam pitch is adjusted to a specified interval, beam emission corresponding to the image data on the scanning surface 18a is started. Meanwhile, as mentioned above, following the input of print start signal, after driving of the deflector 5 is stabilized and the conditions are prepared for other units about image forming (for example, OPC unit, developer, fixing device), beam emission corresponding to the image data on the scanning surface 18a is started.

Thus, according to the multi-beam scanning optical apparatus, since the image is formed on the scanning surface 18a by two beams 21, 22, beam scanning of higher speed or higher resolution is realized as compared with scanning of one beam.

In such conventional construction, however, in order to adjust the beam pitch, it requires two optical path correcting means 40a, 40b in the optical paths of the beams 21, 22, and the cost of the apparatus is increased.

It also requires a mounting space for the optical path correcting means 40a, 40b, and the degree of freedom of layout design of optical system is limited.

Still more, in order to adjust the beam pitch, it requires multiple sensors, and the cost of the apparatus is also increased in this respect.

SUMMARY OF THE INVENTION

The invention is intended to solve the above problems, and by using a sensor having a small detecting surface area, it is an object thereof to present a multi-beam scanning optical apparatus capable of saving space, improving the S/N ratio of the sensor, alleviating the mounting precision of parts and sensor, and optimizing the pitch adjusting range, and also capable of correcting the beam pitch of two beams in the sub-scanning direction by using single optical path correcting means and single sensor.

To achieve the object, in the invention, a lens is put on the optical path between a beam splitter and a photo sensor for adjusting beam pitch in order to emit a focused beam to the photo sensor, almost all quantity of light can be received by the photo sensor of a small detecting surface area, and the S/N ratio is improved, and deviation of optical path on the sensor unit when assembling can be decreased.

As such lens, by using a cylindrical lens for focusing only in the main scanning direction, the beam diameter and power distribution in the sub-scanning direction are nearly same as when cylindrical lens is not provided, and hence the pitch in the sub-scanning direction can be detected at high precision.

Also by using the lens for focusing in the main and sub-scanning directions, the adjusting range of the beam pitch by knife edge shaped plate can be set properly.

Moreover, by rotating the cylindrical lens for focusing in the main scanning direction about the center of the optical axis, the beam diameter in the sub-scanning direction suited to beam pitch adjustment by the knife edge shaped plate can be easily obtained.

Still more, by comprising means for moving the knife edge shaped plate in the sub-scanning direction, position adjustment of knife edge suited to the beam pitch is facilitated.

BRIEF DESCRIPTION OF THE DRAWINGS

FIG. 5 is a diagram showing the target set value of the beam 22 at various beam pitches on the sensor output curve in embodiment 1.

FIG. 7(a) is a block diagram of a multi-beam scanning optical apparatus in embodiment 2 of the invention.

FIG. 7(b) is a magnified view of photo sensor 12 in FIG. 7(a).

FIG. 8 is an optical relation diagram of deflecting surface 6 and scanning surface 18a in embodiment 2.

FIG. 9 is a diagram showing difference in sensor output curve due to difference in beam diameter in embodiment 2.

FIG. 10(a) is an explanatory diagram of adjusting method of beam diameter when cylindrical lens is used as focusing lens in embodiment 2.

FIG. 10(b) is a diagram showing a beam rotating direction in FIG. 10(a).

Figure 1:
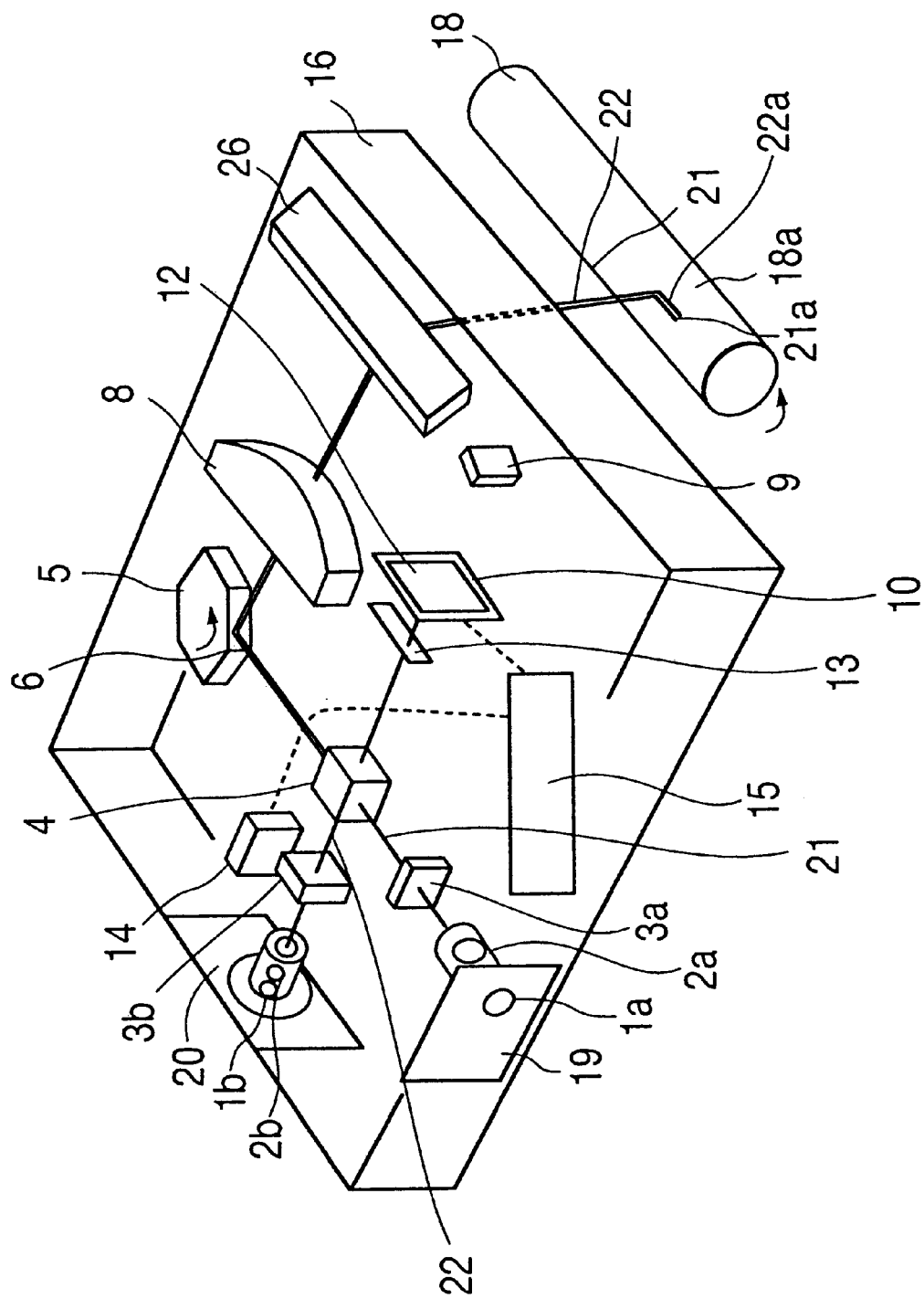
FIG. 1 is an explanatory diagram showing a multi-beam scanning optical apparatus in embodiment 1 of the invention.

DESCRIPTION OF THE PREFERRED EMBODIMENTS (Embodiment 1)

A multi-beam scanning optical apparatus in embodiment 1 of the invention is described below while referring to FIG. 1 to FIG. 6. In the drawings, members having the same function and same purpose in description of prior art are identified with same reference numerals, and duplicate explanations are omitted.

First of all, the construction of the multi-beam scanning optical apparatus according to embodiment 1 is described.

As shown in FIG. 1, the multi-beam scanning optical apparatus in embodiment 1 comprises a drive circuit 19 for emitting a beam 21 by driving a first light source 1a, and a drive circuit 20 for emitting a beam 22 by driving a second light source 1b. As the beam 21 and beam 22 are emitted, an electrostatic latent image is formed on a scanning surface 18a of a uniformly charged photosensitive drum 18. A collimator lens 2a is provided in correspondence to the first light source 1a, and a collimator lens 2b, to the second light source 1b, and the beams 21, 22 from the light sources 1a, 1b are transformed into coherent beams by these collimator lenses 2a, 2b.

On optical paths of the beams 21, 22 passing through the collimator lenses 2a, 2b, cylindrical lenses 3a, 3b for focusing the beams 21 and 22 in the sub-scanning direction, and a beam splitter 4 for adjusting the optical axes of the beams 21, 22 are disposed. Besides, optical path correcting means 14 is provided for correcting the sub-scanning direction of the beam 22 by moving the cylindrical lens 3b in the sub-scanning direction.

Moreover, on optical paths of the beams 21, 22 from the beam splitter 4 to the photosensitive drum 18, there are disposed a deflector 5 having a deflecting surface 6 for deflecting the two beams 21, 22 simultaneously, a scanning lens system 8 for focusing the beams 21, 22 deflected by the deflector 5 on the scanning surface 18a of the photosensitive drum 18, and a mirror 26 for leading the beams 21, 22 up to the scanning surface 18a.

On the optical path of the beams 21, 22 emitted from the beam splitter 4 in a different direction from the deflecting surface 6, a sensor unit 10 is disposed for detecting the quantity of light of the beams. This sensor unit 10, together with a knife edge shaped plate 13, detects the beam position of the beams 21 and 22 in the sub-scanning direction. The sensor unit 10 is composed of a photo sensor 12 for detecting the positions of the beams 21, 22. Between the beam splitter 4 and the sensor unit 10, the knife edge shaped plate 13 is disposed for partially shielding the beams 21, 22 running from the beam splitter 4 toward the sensor unit 10. The position of disposing the shielding plate 13 is a position optically equivalent to the defecting surface 6.

To control scan timing of the beams 21, 22 scanned by the deflector 5 in the main scanning direction, a synchronism detector 9 is disposed. By this synchronism detector 9, the beams 21, 22 corresponding to the image data are emitted to the scanning surface 18a at the timing of specified time. Moreover, an optical path correcting means control circuit 15 is provided to control the sub-scanning direction of the beam 22 by driving optical path correcting means 14 on the basis of the signal from the sensor unit 10. Other members than the photosensitive drum 18 are accommodated in a housing 16.

Below is explained the structure of the optical path correcting means 14 for correcting the optical path of the beam 22.

Figure 2:
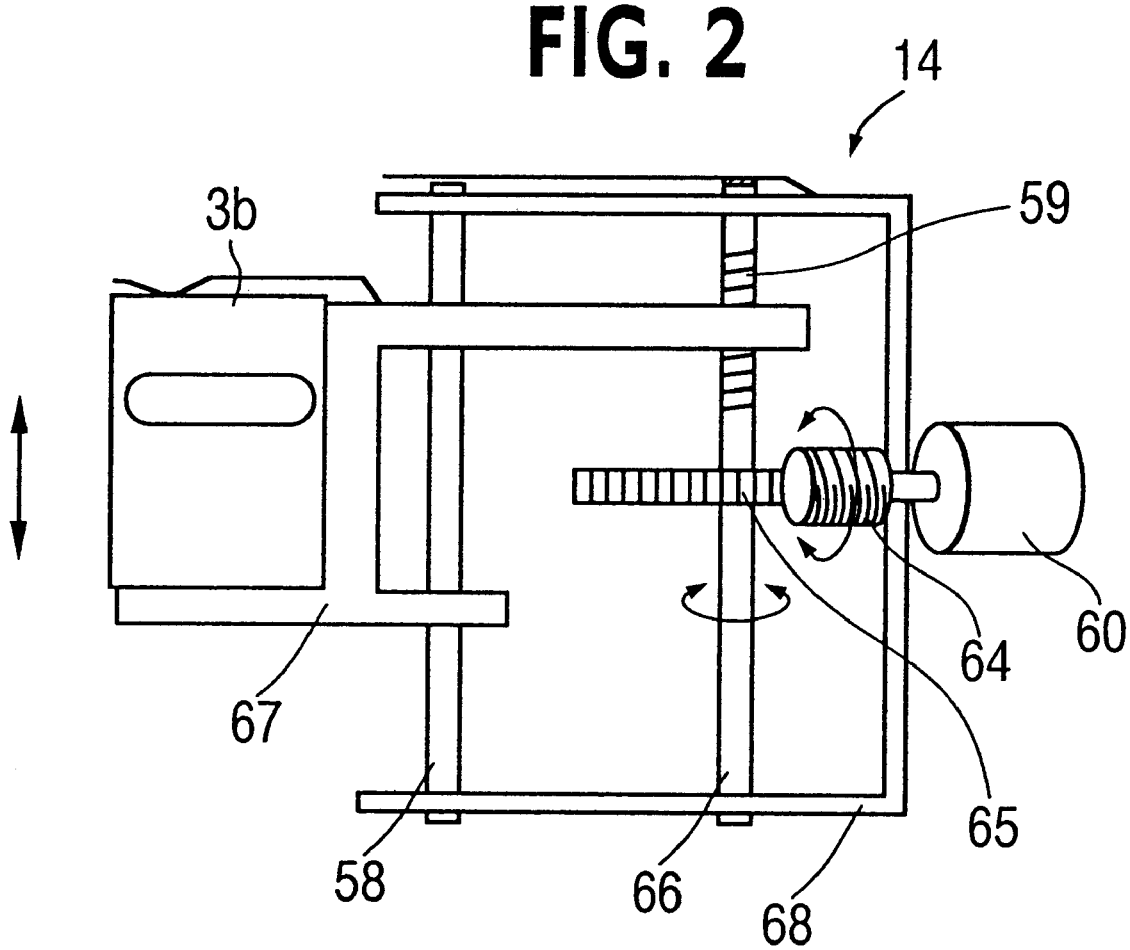
FIG. 2 is a structural diagram of optical path correcting means in the multi-beam scanning optical apparatus in embodiment 1.

As shown in FIG. 2, the optical path correcting means 14 for correcting the sub-scanning direction of the beam 22 by moving the cylindrical lens 3b in the sub-scanning direction has a lens holder 67 to which the cylindrical lens 3b is fixed. A base 68 is set over the lens holder 67, and a shaft 66 and a guide shaft 58 extending in the sub-scanning direction penetrate through it. The lens holder 67 is slidably fitted to the shaft 66 and guide shaft 58.

The shaft 66 is rotatably mounted on the base 68. Screw 59 is formed on the surface of the shaft 66 by a specified length, and said screw 59 is engaged with a nut formed in the shaft penetrating position of the lens holder 67.

The base 68 has a stepping motor 60, a worm gear 64 provided on the shaft of this stepping motor 60, and a worm wheel 65 engaged with the worm gear 64, and the worm wheel 65 is engaged with the shaft 66. Therefore, when the stepping motor 60 rotates, the shaft 66 is rotated by the worm wheel 65. By this rotation of the shaft 66, the lens holder 67 holding the cylindrical lens 3b is moved in the sub-scanning direction along the guide shaft 58.

In thus constructed multi-beam scanning optical apparatus, an outline of operation is described below.

The beams 21, 22 are adjusted to coherent beams by the collimator lenses 2a, 2b. Then the beams 21, 22 are focused in the sub-scanning direction by the cylindrical lenses 3a, 3b. At this time, the beam 22 is adjusted of pitch in the sub-scanning direction by the optical path correcting means 14, but the detail will be described later.

The beams 21, 22 passing through the cylindrical lenses 3a, 3b are matched in the optical axis by the beam splitter 4, and are deflected in the main scanning direction by the deflector 5, and reflected by the mirror 26 and emitted to the scanning surface 18a of the photosensitive drum 18. At this time, the beam 21 or 22 reflected by the deflecting surface 6 of the deflector 5 is focused by the scanning lens system 8 so as to form a focus on the entire area of the scanning surface 18a. Further, the synchronism detector 9 detects the timing of the deflected beam 21 or 22 crossing the synchronism detector 9, so that the main scanning direction is synchronized. As a result, at the timing of specified time, the light of the intensity corresponding to the image data is emitted by the drive circuits 19, 20, and two-dimensional images 21a, 22a are formed by the beams 21, 22 on the scanning surface 18a.

Next is described an outline of beam pitch adjustment of multi-beam scanning optical apparatus having the knife edge shaped plate fixed in sub-scanning direction 13 as shown in FIG. 1.

The each position of beams 21 and 22 refer to the knife edge portion 13a of the knife edge shaped plate 13 of the beams 21 and 22 each, and the output characteristic of the sensor unit 10 are measured by using a measuring apparatus as an equipment in a assembling factory. The measured values are stored in the beam scanning optical apparatus as the back data of the beams. A typical example of the back data is output characteristic data shown in FIG. 3.

Of the beams 21 and 22, the beam 21 not having the optical path correcting means 14 is the reference for pitch adjustment.

When using the apparatus, the reference beam 21 is emitted first, and the output value of the sensor unit 10 is read.

From the back data and the read output value of the beam 21, the position of the beam 21 against the knife edge portion 13a is detected.

The position of the beam 21 is projected on the back data of the beam 22, and this point is registered as the origin of position adjustment of the beam 22.

Using the back data of the beam 22 registering the origin, the sensor output value at the position remote from the origin by the beam pitch to be set is determined, and it is set as the set target value of the beam 22.

Stopping emission of the beam 21, consequently, the beam 22 is emitted, and the cylindrical lens 3b is moved in the sub-scanning direction by using the optical path correcting means 14 so that the output of the sensor 12 may match with the set target value.

When the output value of the sensor reaches the set target value, the cylindrical lens 3b is stopped, and adjustment of beam pitch is completed.

Thus, having the back data and adjusting the position of the reference beam 21 on every necessary occasion enable various errors represented by the indication changes of the apparatus to be corrected.

Principal operations are described in detail below.

First, referring to FIG. 1, detection of the beam position against the knife edge portion 13a of the beam 21 is described. When the beam 21 is emitted by the drive circuit 19, the beam 21 passes through the collimator lens 2a, cylindrical lens 3a, and beam splitter 4, and is separated into two beams; one is beam directed toward the deflecting surface 6 and the other is a beam directed toward the sensor unit 10. The beam 21 directed toward the deflecting surface 6 is emitted to the scanning surface 18a, and the beam 21 directed toward the sensor unit 10 is guided into the photo sensor 12 in order to detect the beam position. Between the photo sensor 12 and the beam splitter 4, the knife edge shaped plate 13 is provided as the reference for beam pitch adjustment. When part or whole of the beam 21 is shielded by the knife edge shaped plate 13, the quantity of light reaching the photo sensor 12 varies with the shield quantity.

Figure 4:
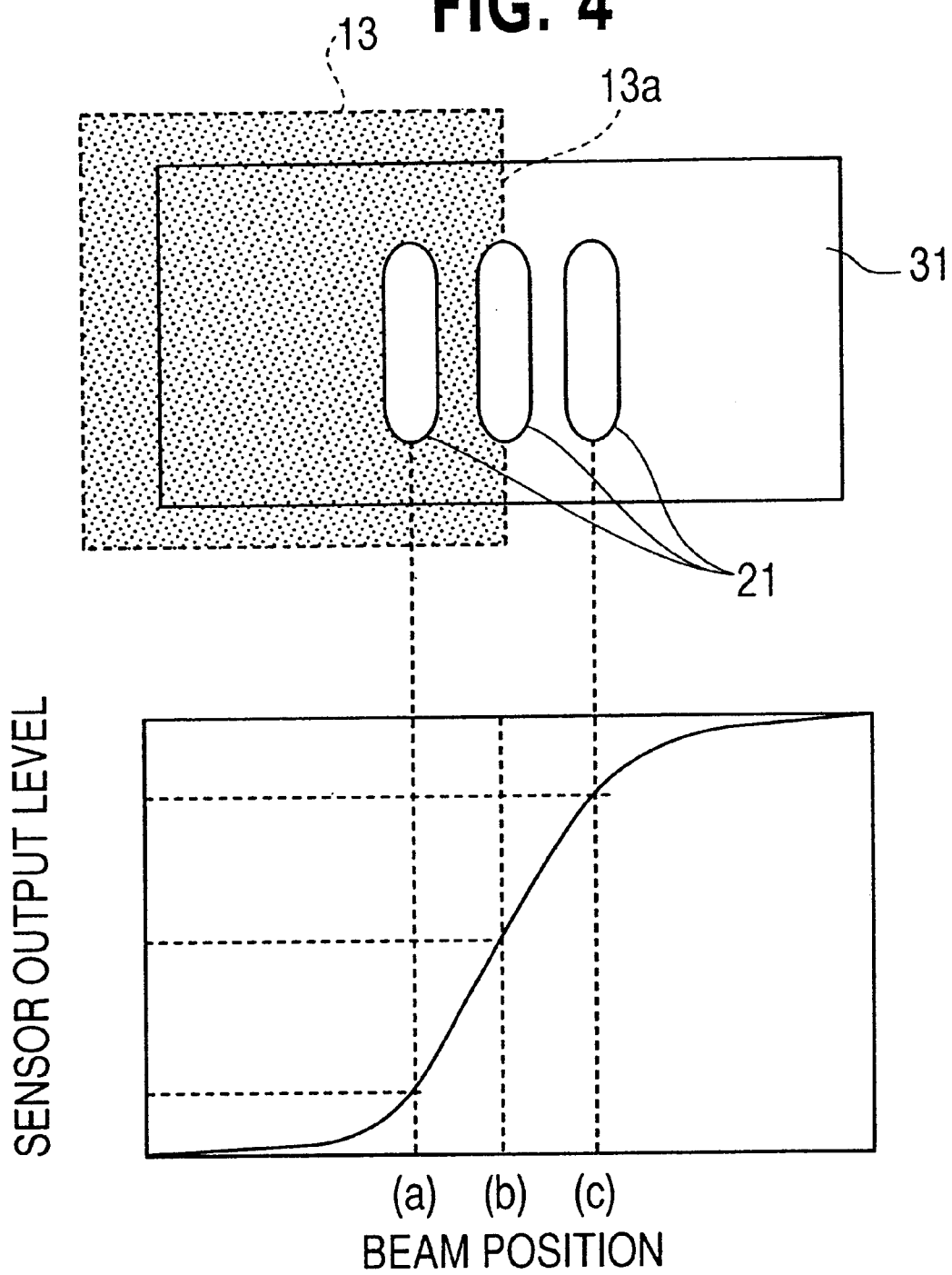
FIG. 4 is a diagram showing the relation between beam position at a knife edge portion 13a of sensor and output level on the output curve in embodiment 1.

This is further described while referring to FIG. 4. The sensor output is low at beam position (a) where almost entire beam 21 is shielded by the knife edge shaped plate 13. At beam position (b) where the center of the beam 21 nearly coincides with the edge 13a of the knife edge shaped plate 13 and the light is shielded by about half, on the other hand, the sensor output is about half of the maximum output. At beam position (c) where the beam 21 is not shielded by the knife edge shaped plate 13, the sensor output is nearly the maximum. As shown below in FIG. 4, when the center of the beam 21 approaches closely to the knife edge portion 13a, a slope of the sensor output changes steep suddenly. Therefore, near the knife edge portion 13a, the distance between the knife edge portion 13a and beam 21 can be detected with high precision.

Figure 3:
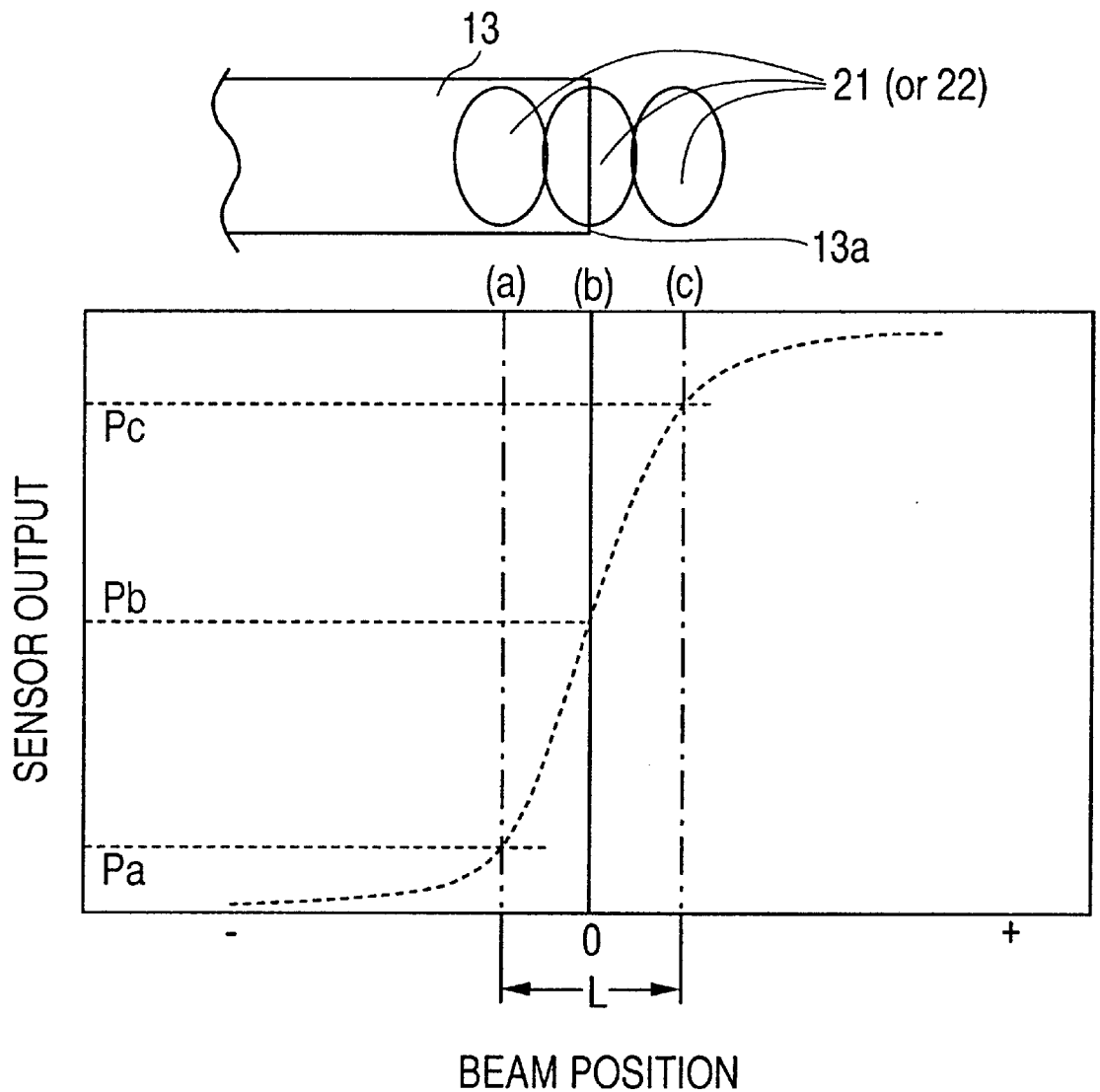
FIG. 3 is a diagram showing the relation between beam position and sensor output curve in a beam position detecting device in embodiment 1.

This is further described by referring to FIG. 3.

On the axis of abscissas in FIG. 3, the position of the knife edge portion 13a is set at the origin, and the distance from the origin to the beam, that is, the beam position is shown. The direction shielded by the knife edge portion 13a is negative, and the opposite direction is positive. The axis of ordinates indicates the sensor output by the beam, and it is proportional to the quantity of incident light to the sensor. If the beam is present at position (a), the majority of the beam is shielded by the knife edge portion 13a, and the sensor output is Pa, and if the beam is present at position (b), (c), the sensor output is Pb, Pc, respectively. As the beam approaches the knife edge portion 13a, the sensor output changes suddenly. By measuring such output data preliminarily when assembling in the factory the scanning optical apparatus and storing said data as back data, the beam position difference of tens of microns can be detected at high precision. That is, it is possible to detect the beam position corresponding to the knife edge portion 13a from the sensor output value.

Referring back to FIG. 1, beam pitch adjustment in the sub-scanning direction of the beams 21, 22 is described. The beam pitch of two beams 21 and 22 is adjusted by setting the beam pitch of the beams 21 and 22 on the deflecting surface 6 at a proper interval. In adjustment of optical path of the beam 22 in the sub-scanning direction, the cylindrical lens 3b is moved in the sub-scanning direction by the optical path correcting means 14.

First, the position of the fixed beam 21 which is the reference of beam pitch adjustment, and cannot be corrected the optical path is detected by employing the method mentioned above.

The beam position of the beam 21 thus obtained is projected on the back data of the beam 22. The axis of abscissas of back data of the both beams, that is, the beam position has its origin on the position of the knife edge portion 13a, and hence they are exactly the same. For projection, therefore, it is only enough to indicate the position of the beam 21 on the axis of abscissas of the back data of the beam 22. On the basis of thus indicated position, the position remote by the distance corresponding to the beam pitch is determined, and it is set as the target position of the beam 22. The sensor output value of this set target position is the target value of setting of the beam 22.

When the set target value of the beam 22 is thus determined in the sensor unit 10, beam emission from the first light source 1a is stopped, and the beam 22 from the second light source 1b is emitted. The beam 22 is adjusted of the beam position, so as to conform to the set target value, by moving the cylindrical lens 3b in the sub-scanning direction by the optical path correcting means 14 according to the signal from the optical path correcting means control circuit 15 so that the output of the sensor 12 may coincide with the set target value. After above operation, beam pitch adjustment of the beams 21 and 22 is completed.

The optical path correcting means 14 for moving the cylindrical lens 3b is explained by referring to FIG. 2.

The speed of the stepping motor 60 is set slow so that the moving extent in the sub-scanning direction of the beam 22 may be about 1 micron at one step. The stepping motor 60 is driven by a signal from the optical path correcting means control circuit 15. The optical path correcting means 14 is large in the reduction ratio of the stepping motor 60 so as to decrease the step of optical path correction, and a worm gear 64 and a worm wheel 65 are employed for driving at further lower torque is employed.

As a result, when the stepping motor 60 rotates, the shaft 66 is rotated by the worm wheel 65. In consequence, the lens holder 67 which is engaged with the screw 59 of the shaft 66 moves in the sub-scanning direction along the guide shaft 58, and the cylindrical lens 3b is also moved accordingly. The parallel light entering the cylindrical lens 3b focuses the beam in the sub-scanning direction, and when the cylindrical lens 3b is moved in the sub-scanning direction, and the position of the beam 22 moves in the sub-scanning direction.

The deflecting surface 6 and the scanning surface 18a are in a conjugate relation optically concerning the sub-scanning direction, and when the beam pitch on the deflecting surface 6 is adjusted to the specified interval, the beam pitch on the scanning surface 18a is adjusted.

For example, supposing the multiplying factor in the sub-scanning direction to be 0.5 times, the step angle of the stepping motor 60 to be 18 degrees, the reduction ratio to be 1/25, and the screw pitch of the screw 59 to be 0.5 mm, the increment P of beam moving on the scanning surface 18a per step by the stepping motor 60 is $P = 0.5 \times 1/25 \times 18/360 \times 0.5$ $= 0.5 \ (\mu m/step)$.

Below is described about the correction control of beam in the optical path correcting means 14.

An example of correction control is a binary control for setting at H level when the sensor output is higher than the set target value of the beam for optical path correction, and L level when lower.

In correction control of beam, while controlling the optical path correcting means 14, the beam 22 is moved toward the changing direction of the sensor output level. When the sensor output level is changed, moving of the beam 22 is stopped.

Herein, owing to the hysteresis for prevention of oscillation of the sensor unit 10 and optical path correcting means control circuit 15, or excessive play of gear and screw of the optical path correcting means 14, a positional difference may occur between when positioned at the changing moment from H level to L level and when positioned at the changing moment from L level to H level. In such a case, the positional difference may be eliminated by setting the level changing direction always the same when positioning.

For example, it is determined to position always when changing from H level to L level. When the sensor output is H level, the position is determined when changing to L level directly, or when the sensor output is L level, the beam 22 is once moved to the position of H level, and moving of beam is stopped when changing from H level to L level. By such control, the beam 22 can be corrected always stably.

At the end of the correction of beam 22, the power feed of the stepping motor 60 is cut off. This is because the optical performance may deteriorate, if the power is always fed to the stepping motor 60, due to heat generation of the stepping motor 60 to cause thermal damage in the lens system and parts in the optical system. Or when constructed by using worm gear 64 and worm wheel 65 as in embodiment 2, the stepping motor 60 having the worm gear 64 is hardly rotated by an external force, and the effects to the optical path of the beam 22 may be decreased if the stepping motor 60 is not always kept in pull-up state. In this way, the position of the beam 22 can be controlled precisely.

Changeover setting of beam pitch is described below.

In the multi-beam scanning optical apparatus, when changing over the resolution in the sub-scanning direction between 300 dpi and 600 dpi, the pitch of the two beams 21, 22 must be changed over.

In the multi-beam scanning optical apparatus of prior art in which the beam pitch is fixed at 300 dpi, if desired to use at 600 dpi, using one beam, the moving speed of the scanning surface 18a must be reduced to ¼ of the speed at 300 dpi, or the speed per scanning of beam must be increased by 4 times.

The former process is realized by reducing the rotating speed of the photosensitive drum 18 to ¼, and the latter is possible by increasing the rotating speed of the deflector 5 by 4 times. In either case, only one beam out of two beams can be used, and the merit of the multi-beam optical system is sacrificed.

By contrast, in the multi-beam scanning optical apparatus in embodiment 1, it is possible to change over the beam pitch between 300 dpi and 600 dpi, and using two beams, it is realized by decreasing the moving speed of the scanning surface 18a to ½, or increasing the speed of beam scanning by 2 times, and always two beams can be used in scanning, and the merit of the multi-beam scanning optical apparatus is utilized. Changeover of beam pitch is realized by preparing plural of set target values for the beam 22 capable of optical path correction, and selecting the set target value corresponding to the specified pitch out of them.

This is further described while referring to FIG. 5.

Suppose the sensor output of the beam 21 not corrected of optical path is L0. At this time, the position of the beam 21 not corrected of optical path is Pos0.

Herein, to change over to 300 dpi, it is only enough to change the position of the beam 22 from Pos0 to Pos1 at a distance of P1. Since the relation between the beam position and sensor output is preliminarily stored as back data, it is known that the set target value at Pos1 is L1. Hence, the beam 22 can be adjusted to L1 by the optical path correcting means 14. Similarly, when 600 dpi is selected, for the sensor output L0 of the beam 21, the set target value of the beam 22 is L2, and it is corrected to the position of Pos2.

This processing is done in an operation unit not shown in the diagram. Changeover of resolution may be done either selected automatically from the plural of preset beam pitch values on the basis of the transmitted information for printing, or selected manually.

Further, by instructing an arbitrary resolution from outside to the operation unit not shown, the user of the scanning optical apparatus can be set the resolution freely.

In this way, since the beam pitch can be changed over freely, it is not necessary to add a new sensor or manufacture a new sensor. Besides, it does not require additional process for extending the beam in the main scanning direction in the sensor unit 10, or emitting the beam to an added sensor.

Other method of beam pitch adjustment by modified FIG. 1 partially is explained below.

Figure 6A:
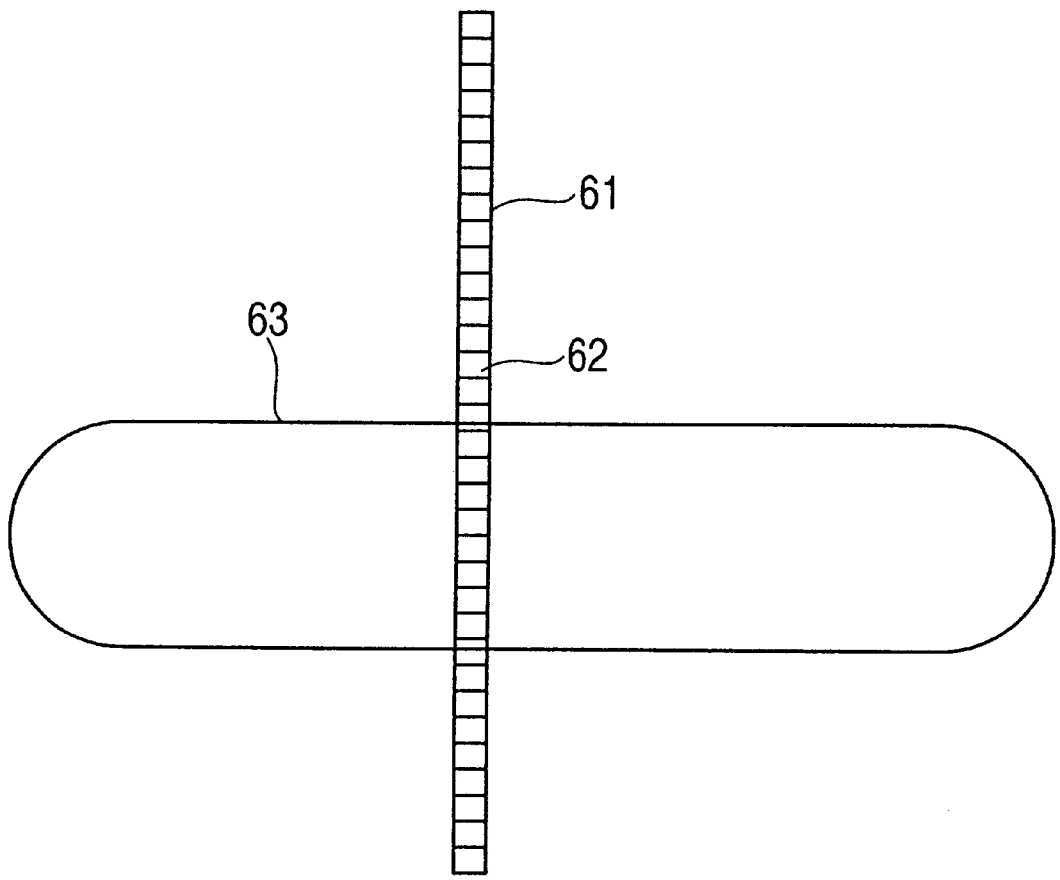
FIG. 6(a) is an explanatory diagram showing a mounting state of a line shaped position sensor 61 in embodiment 1.

Omitting the knife edge shaped plate 13 in FIG. 1, a line shaped CCD or PSD or similar position sensor as shown by reference numeral 61 in FIG. 6(a) is used as the sensor unit 10, and by reading the absolute position of each beam directly, a specified beam pitch can be obtained.

In the case of using the knife edge shaped plate 13, the positions of the two beams 21, 22 are detected by the relative distance to the knife edge portion 13a. By contrast, by installing the position sensor, the beam pitch can be corrected by detecting the positions of the two beams directly. Incidentally, the size of one pixel relating to position detection of CCD or PSD for general use or the position detecting precision is about 10 microns, and when it is directly used in detection of beam pitch interval, the position detecting precision is too coarse. Accordingly, as shown in FIG. 6(b), by installing the line shaped position sensor at an inclination to the sub-scanning direction, the size of one pixel in the sub-scanning direction is decreased spuriously, so that the position detecting precision is enhanced.

Or as shown in FIG. 6(a) or (b), the line shaped position sensor 61 has such a structure in which plural pixels 62 are arranged in one row. The shape of a beam 63 in the position sensor 61 is extended in the lateral direction, being reduced only in the sub-scanning direction, in order to correct tilting of the deflecting surface 6.

As shown in FIG. 6(a), when the line shaped position sensor 61 is installed directly in the sub-scanning direction, supposing the beam diameter in the sub-scanning direction to be 100 microns, the beam 63 is received in about ten pixels 62 at the position sensor 61. Accordingly, the position of the beam 63 must be judged from the signals of these ten pixels 62.

Figure 6B:
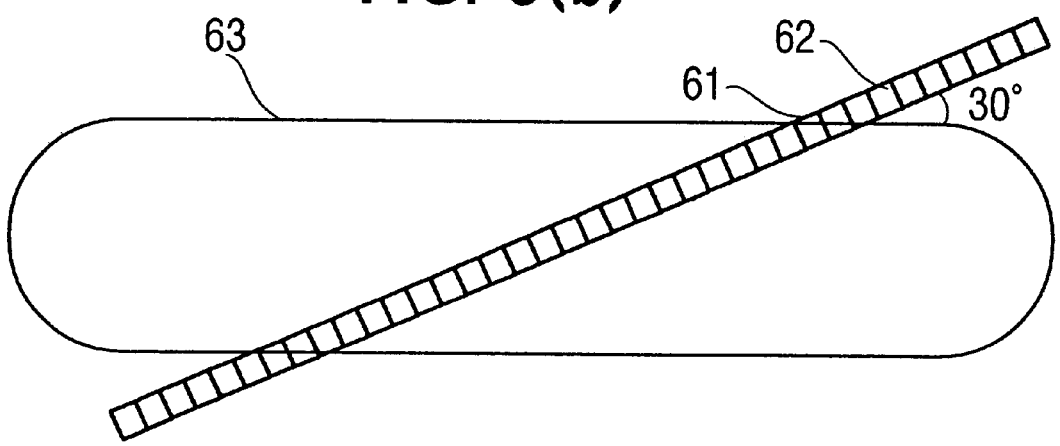
FIG. 6(b) is a diagram showing a mounting condition for enhancing the detection precision of the position sensor 61 in embodiment 1.

On the other hand, as shown in FIG. 6(b), when the linear position sensor 61 is installed at an inclination of, for example, 30 degrees to the sub-scanning direction, the beam 63 is received in about twenty pixels 62, and the precision of detecting the position of the beam 63 can be enhanced. At the position sensor 61, the beam 63 has a length of about 2 to 5 mm in the main scanning direction, and therefore if the position sensor 61 is inclined largely, the beam 63 is not dislocated from the sensor 61.

Thus, the position sensor 61 detects the absolute position of the beam 21 not corrected of optical path, and the optical path correcting means 14 corrects so that the position of the beam 22 corrected of optical path may come to the position remote by the pitch portion from the absolute position of the beam 21, so that the adjustment of beam pitch is complete.

In this case, after selecting a desired beam pitch from plural preset beam pitches, the beam position corresponding to the selected beam pitch is calculated, and then the beam may be matched to the calculated value.

In the multi-beam scanning optical apparatus according to embodiment 1, as mentioned herein, optical path of one beam 22 can be corrected in the sub-scanning direction, and the output level of other beam 21 of which optical path cannot be corrected is detected by the sensor unit 10, the set target position of the beam 22 at a proper beam pitch is determined from this output level and the back data of the beam 21, this set target position is applied in the back data of the beam 22, the set target value of the sensor output level of the beam 22 is calculated, the optical path of the beam 22 is corrected, and the output level of the sensor unit 10 is adjusted to the set target value, so that the beam pitch is adjusted.

In other method of beam pitch adjustment of embodiment 1, instead of using knife edge shaped plate a line shaped position sensor is used as the sensor, and the positions of the both beams are detected directly, and the optical path of one beam 22 is corrected, thereby adjusting the beam pitch.

In either method, a common effect is that the beam pitch correction in the sub-scanning direction of two beams can be done by using only one optical path correcting means and one sensor.

Also according to embodiment 1, it is not necessary to add a sensor newly or manufacture a special sensor, and the beam pitch can be set to an arbitrary interval only by selecting the set target value.

Further according to embodiment 1, the absolute position of the beam of which optical path cannot be corrected is detected at high resolution, and with respect to this detected position, the position of the other beam is moved in the sub-scanning direction to adjust the beam pitch, and therefore beam pitch correction of two beams in the sub-scanning direction can be done by using one optical path correcting means and one sensor.

According to the invention as described herein, the number of optical path correcting means and sensors can be saved, so that a multi-beam scanning optical apparatus of compact optical system is obtained at low cost.

(Embodiment 2)

A multi-beam scanning optical apparatus in embodiment 2 of the invention is described below while referring to FIG. 7 to FIG. 11. In the drawings, members having the same function and same purpose in description of embodiment 1 and prior art are identified with same reference numerals, and duplicate explanations are omitted.

FIG. 7(a) is a structural diagram of the multi-beam scanning optical apparatus in embodiment 2 of the invention, particularly showing the construction of the section relating to beam pitch adjustment of the scanning optical apparatus of embodiment 2. The different point from the multi-beam scanning optical apparatus of prior art is that a focusing lens 37 is provided between a beam splitter 4 and a photo sensor 12. In this multi-beam scanning optical apparatus, other operation than adjustment of beam pitch is same as in the prior art, and its explanation is omitted, and only the pitch adjustment by using the focusing lens 37 and the related matter are described below.

First, as shown in FIG. 7(a), the focusing lens 37 is disposed on the optical path of beam for beam position detection, and a knife edge shaped plate 13 is movable, and the beam pitch adjustment of such multi-beam scanning optical apparatus is briefly described below.

To begin with, as the reference of beam pitch adjustment, a beam 22 of which optical path cannot be corrected is emitted, and the knife edge shaped plate 13 is moved in the sub-scanning direction, and stopped when the sensor output reaches a predetermined value.

At this time, the position of the knife edge shaped plate 13 is measured by a position measuring instrument for assembling of the scanning optical apparatus. This is the reference position of the beam.

The position remote from the beam reference position by the portion of beam pitch is the set target position of a beam 21.

Next, emission of the beam 22 is stopped, and the beam 21 is emitted.

A cylindrical lens 3*b* is rotated in the sub-scanning direction until the position of the beam 21 reaches the set target position. At this time, the position is measured by the same position measuring instrument.

The sensor output when the beam 21 reaches the set target position is the set target value of the beam 21.

As required, plural set target values corresponding to plural beam pitches are measured, and stored in the scanning optical apparatus.

When printing by using this multi-beam scanning optical apparatus, selecting a desired set target value among the set target values, the cylindrical lens 3*b* is adjusted so that the sensor output of the beam 21 may conform to it.

In this case, the set target values may be stored in the scanning optical apparatus either in the software or in the hardware.

The focusing lens 37 which is characteristic of embodiment 2 is described below.

In FIG. 7(*a*), beams 21, 22 emitted from light sources 1*a*, 1*b* and focused in the sub-scanning direction by the cylindrical lens pass through the beam splitter 4, and the beams are reduced by the focusing lens 37, and fed into the sensor unit 10. Using cylindrical lens as the focusing lens 37, the beam can be reduced only in the main scanning direction. Therefore, as shown in FIG. 7(*b*) which is a magnified view of the photo sensor 12, the beam 21 or 22 entering the sensor unit 10 was linear in the absence of the focusing lens 37, but is shaped in a nearly circular beam. By thus reducing the beam, almost all beams from the light source can be detected by the photo sensor 12 small in the detecting surface area. Besides, if the optical axis is deviated due to parts precision or assembling precision, the beam is corrected to be closer to the normal optical axis by the focusing lens 37, and the working efficiency is enhanced by suppressing fluctuations of optical path in the photo sensor 12 at the time of assembling.

Figures 15A, 15B:
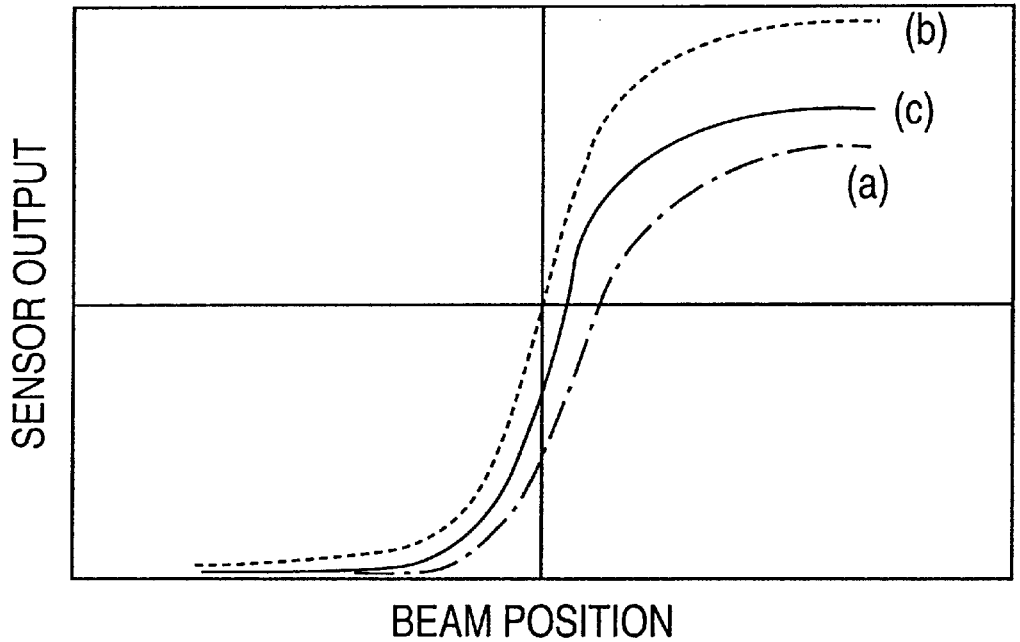
FIG. 15(a) is a diagram explaining a difference in sensor output curve due to difference in beam position on the sensor detecting surface in a prior art.
FIG. 15(b) is a diagram for explaining the difference in beam position in FIG. 15(a).

The advantage of the photo sensor 12 capable of detecting almost all beams is explained below. FIG. 15(*a*) and FIG. 15(*b*) show the relation between beam position and sensor output according to the prior art. As shown in FIG. 15(*b*), if the beam on the photo sensor detecting surface 38 varies to right and left as in positions (a), (b), (c), the quantity of detected light fluctuates, and the sensor output fluctuates as indicated by curves (a), (b), (c) in FIG. 15(*a*). In embodiment 2, on the other hand, by reducing the beam by the focusing lens 37, if the beam position varies right and left within certain limits, the beam is not dislocated from the detecting surface 38, and the output characteristic is always closer to the sensor output curve (c). When the sensor output curve is thus constant, the allowance for setting constants of the sensor output circuit is wider, and the working efficiency of adjustment and working efficiency of checking failure of optical apparatus can be enhanced.

The position of installation of focusing lens 37 may be considered in two cases, one is between the beam splitter 4 and the knife edge shaped plate 13, and the other is between the knife edge shaped plate 13 and photo sensor 12, and it may be installed at either position.

In the former case, the space between the knife edge shaped plate 13 and photo sensor 12 can be smaller and the beam diameter in the sub-scanning direction can be changed at the knife edge shaped plate 13. In the latter case, the beam pitch can be adjusted at the knife edge shaped plate 13 under the same condition as on the deflecting surface 6. Either may be selected depending on the layout of the multi-beam scanning optical apparatus or beam pitch specification.

The beam diameter on the deflecting surface 6 is briefly described while referring to FIG. 8 and FIG. 9. The scanning lens system 8 is designed so that the deflecting surface 6 and the scanning surface 18*a* may be in a conjugate relation optically with respect to the sub-scanning direction. This relation is shown in FIG. 8.

In FIG. 8, supposing the multiplying factor of the scanning lens system 8 in the sub-scanning direction to be M, and the beam diameter of the scanning surface 18*a* in the sub-scanning direction to be W, the beam diameter W0 on the deflecting surface 6 is W0=W/M. Therefore, once the beam diameter of the scanning surface 18*a* in the sub-scanning direction is determined, the beam diameter on the deflecting surface 6 is also determined. When detecting the sub-scanning direction of the beam by using the knife edge shaped plate 13, the range capable of detecting at high precision varies with the beam diameter in the sub-scanning direction on the deflecting surface 6.

FIG. 9 shows how the curve of the sensor output corresponding to the distance between the knife edge portion 13*a* and beam position (that is, beam position) varies depending on the beam diameter on the deflecting surface 6. Herein, B1, B2, B3 (B1<B2<B3) denote beam diameters at the knife edge portion 13*a*, and the beam diameters increase sequentially. When the beam diameter is as small as B1, the sensor output curve is a steep curve, and the sensitivity to the change of beam position is higher, while the detecting range of beam position becomes narrower. To the contrary, when the beam diameter at the knife edge portion 13*a* is as large as B3, the sensor output curve is dull, and the sensitivity to the change of beam position is lower, but the detecting range of beam position becomes wider.

For example, the beam 21 of the first light source 1*a* is adjusted at the beam pitch L corresponding to the beam 22 of the second light source 1*b* as shown in FIG. 9. Suppose the position of the beam 22 is Pos1, the beam 21 is adjusted to Pos2 at beam pitch L. In this case, if the beam diameter at the knife edge portion 13*a* is B1, the sensitivity to the beam position is high near Pos3, but the sensitivity is dull at the position of Pos2. Although the sensitivity of B3 near Pos3 is lowered, B1 has a larger inclination at the position of Pos2. At B2, the inclination to the beam position at Pos2 is larger than in the case of B3, and the beam diameter of B2 is suited to detection of beam position.

Hence, when adjusting the beam pitch, it is preferred to set the beam diameter in the sub-scanning direction at the knife edge shaped plate 13 should be set at an appropriate diameter. In the multi-beam scanning optical apparatus of the prior art, since the beams are parallel light, and the beam diameters are same at the deflecting surface 6 and knife edge shaped plate 13, depending on the relation between the beam pitch and beam diameter, the detecting precision of beam position may be lowered. In such a case, in order to change the beam at the knife edge shaped plate 13 to size and shape suited to position detection, it is necessary to install the focusing lens 37 for focusing in the main scanning and sub-scanning direction between the beam splitter 4 and knife edge 13 to form a beam suited to detection of beam position.

In embodiment 2, by installing the focusing lens 37, the beam size and shape at the knife edge 13 can be optimized, thereby obtaining the beam diameter in the main scanning direction suited to assembling and adjusting, and the beam diameter in the sub-scanning direction suited to enhancement of beam pitch precision.

FIGS. 10(a) and (b) show a method of changing the beam diameter in the sub-scanning direction when using a cylindrical lens as the focusing lens 37. By rotating the cylindrical lens provided for reducing the beam in the main scanning direction about the center of the optical axis as indicated by arrow in FIG. 10(b), the beam shape changes as indicated by beam rotation positions (a), (b), (c) in FIG. 10(a), and consequently the beam diameter in the sub-scanning direction also changes. While the cylindrical lens is not rotated, the focusing action for reducing the beam only in the main scanning direction is working (the case at rotation position (a)). By rotating it with respect to the optical axis of the cylindrical lens, the focusing action of the lens in the main scanning and sub-scanning direction may be changed slightly (the case of rotation positions (b), (c)).

Therefore, by rotating the cylindrical lens and adjusting to the beam diameter in the sub-scanning direction suited to beam pitch adjustment, or by mounting the cylindrical lens preliminarily in rotated state, the same effects as when using the focusing lens 37 having an appropriate focusing action in the main scanning and sub-scanning direction are obtained.

The knife edge shaped plate 13 is arranged as a reference position optically, but due to fluctuations by assembling of optical system, precision of parts, or effects of focusing lens 37 inserted as explained above, the beam position may not be detected at the predetermined position of the knife edge shaped plate 13. For example, if the beam 22 is completely shielded by the knife edge shaped plate 13, or if almost all beam is passed through to the contrary, the beam position cannot be detected. In such a case, by installing a mechanism for moving the knife edge shaped plate 13 in the sub-scanning direction, the knife edge portion 13a must be adjusted to the position for detecting the position of the beam.

Figure 11:
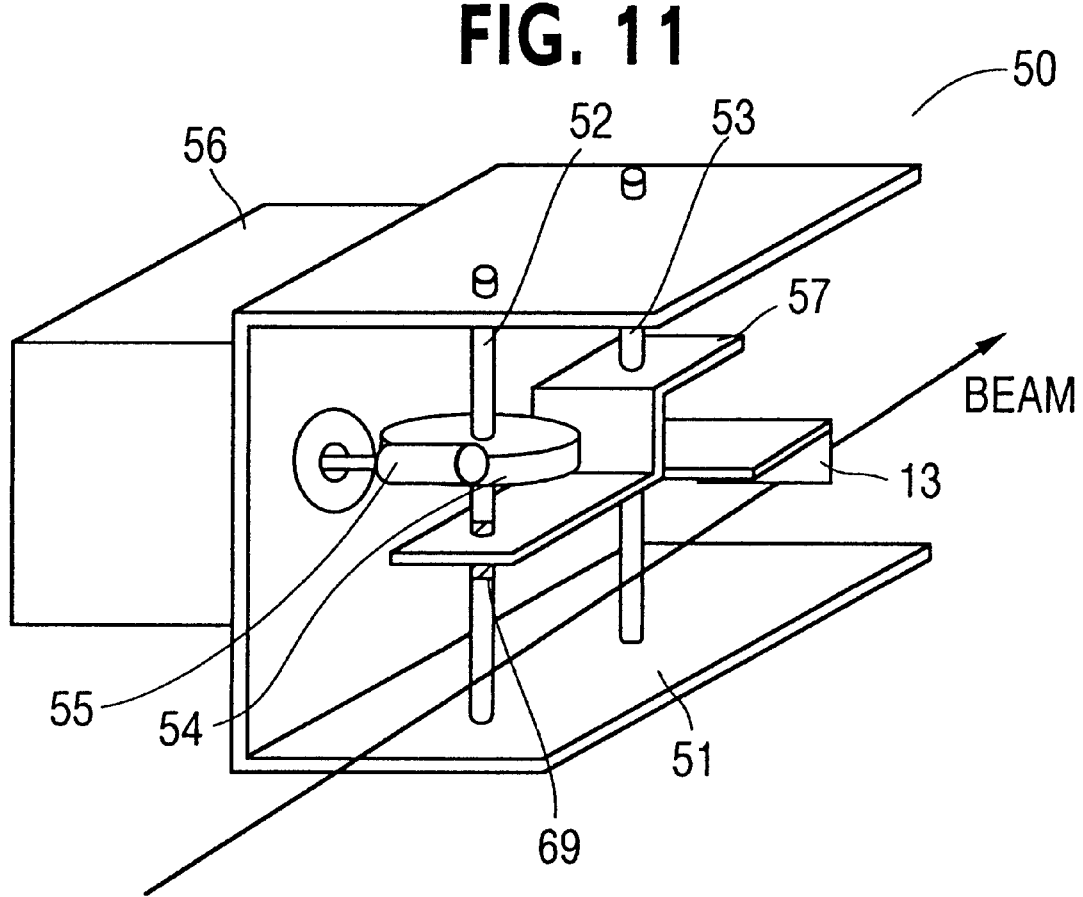
FIG. 11 is a diagram showing a structural example for moving a knife edge shaped plate 13 in embodiment 2.
Figure 12A:
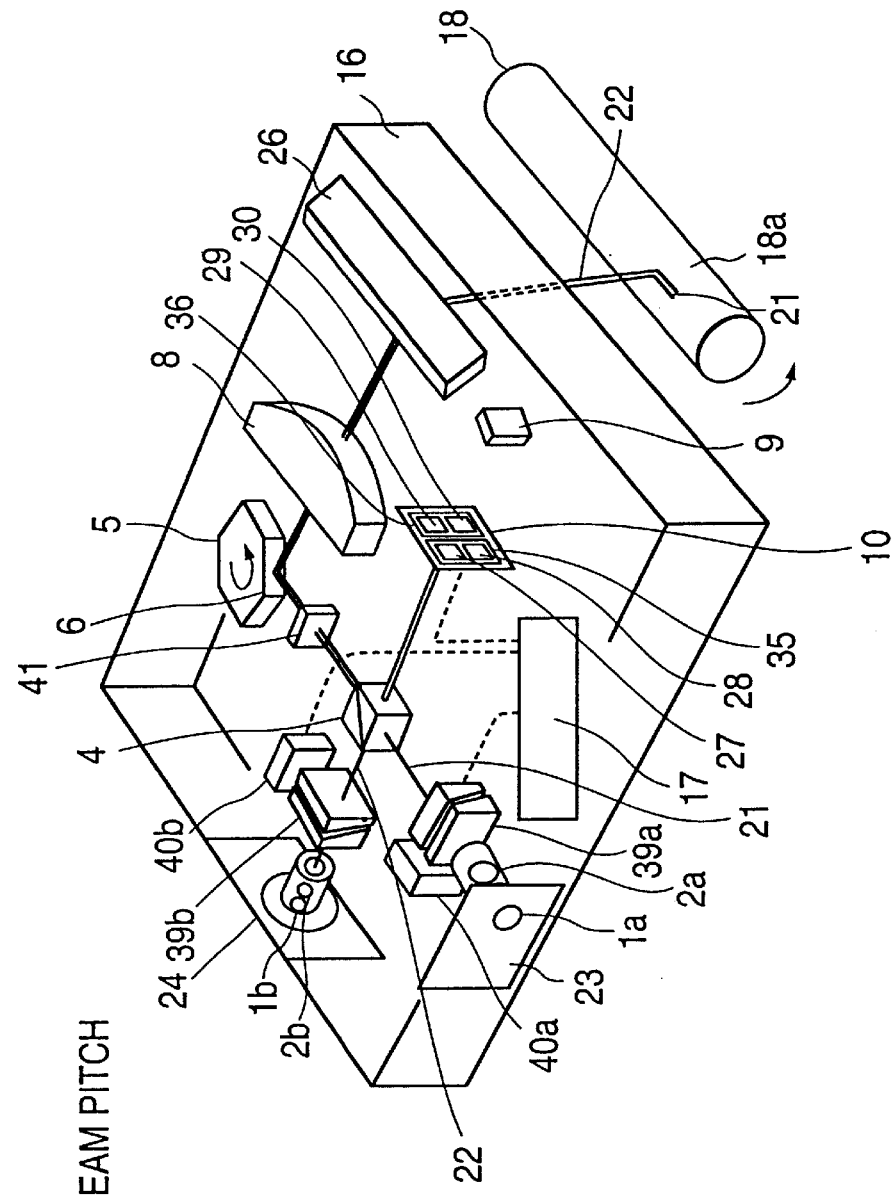
FIG. 12(a) is a diagram showing an example of multi-beam scanning optical apparatus in a prior art.
Figure 12B:
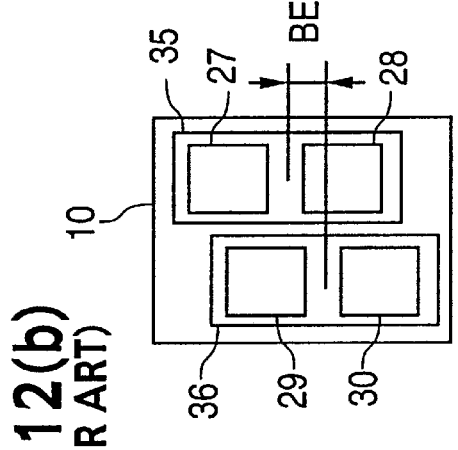
FIG. 12(b) is a magnified view of photo sensor 10 as seen from beam incident direction in FIG. 12(a).
Figure 13A:
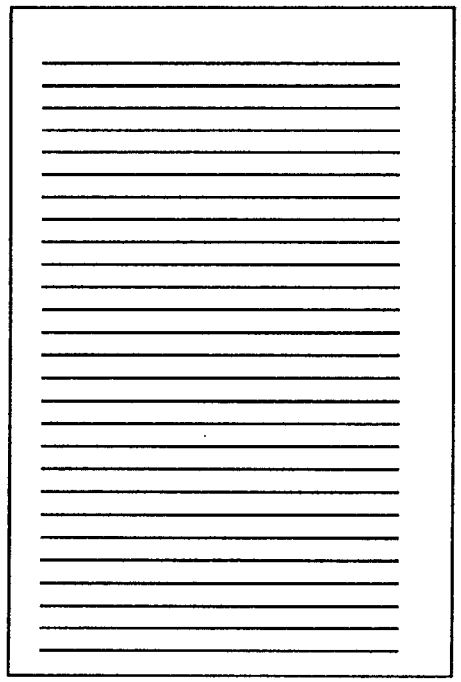
FIG. 13(a) is a diagram showing an example of scanning image of normal beam pitch in the multi-beam scanning optical apparatus.
Figure 13B:
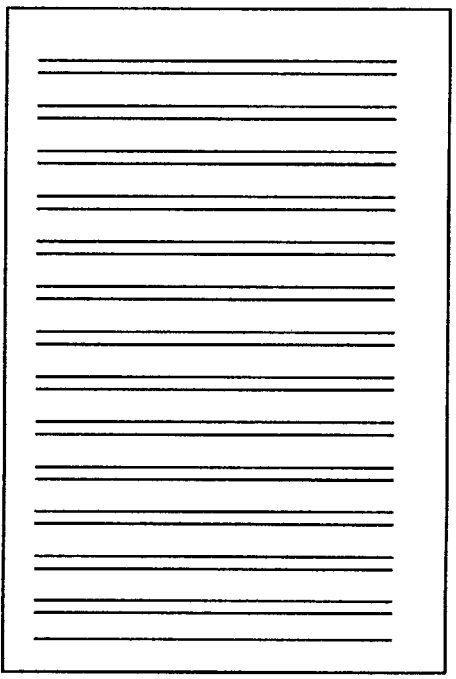
FIG. 13(b) is a diagram showing an example of scanning image of abnormal beam pitch in the multi-beam scanning optical apparatus.
Figure 14A:
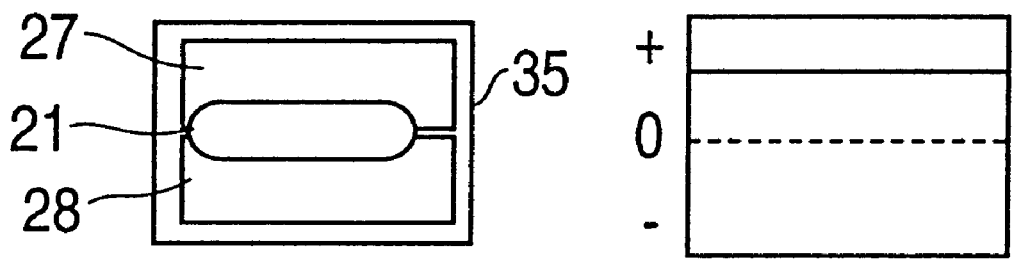
FIGS. 14(a), (b), (c) are diagrams for explaining the relation between beam position and detecting surface output when adjusting the beam position by using two-division sensors in a prior art.
Figure 14B:
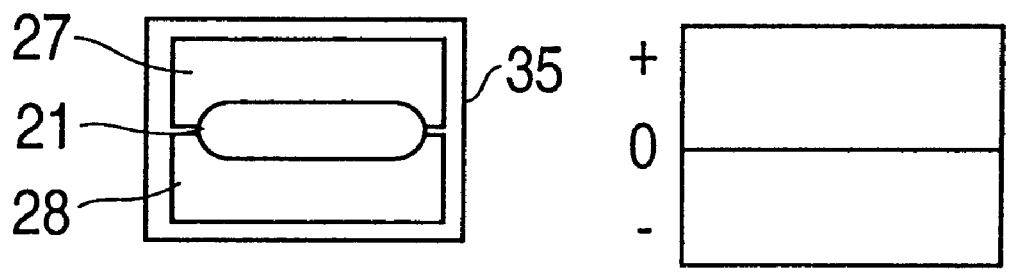
Figure 14C:
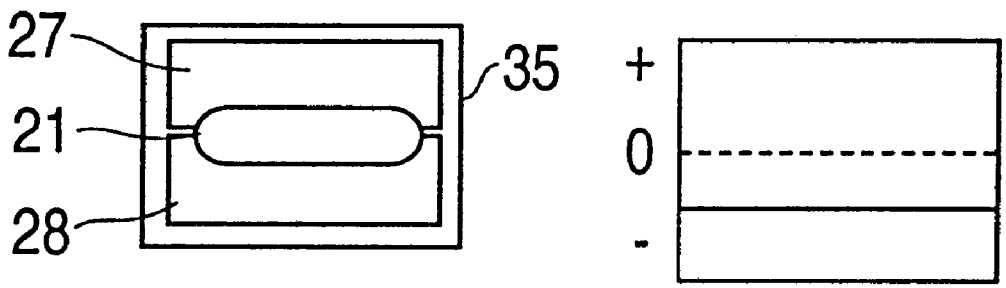

FIG. 11 shows an example of mechanism of shielding plate moving means 50 for moving the knife edge shaped plate 13. In FIG. 11, a worm gear 55 rotates a worm wheel 54 by rotation of a stepping motor 56, and shaft A 52 rotates, and a shielding plate holder 57 is moved in the vertical (sub-scanning) direction along a shaft B 53 by a screw 69 in the lower part of the shaft A 52. This mechanism is similar to the optical path correcting means 14.

Since the beam 22 cannot be corrected of optical path, the knife edge shaped plate 13 is adjusted so that the quantity of light of the beam 22 emitted to the photo sensor 12 may be a specified value. As an example of control, it may be done in a same method as when adjusting the beam position by the optical path correcting means control circuit 15 in embodiment 1. That is, by gradually moving the knife edge portion 13a in the sub-scanning direction, it is stopped when the output of the photo sensor 12 reaches a certain level.

As the advantage of using such mechanism, since the distance between the reference beam 22 and knife edge portion 13a can be always kept constant, the photo sensor output for adjusting the beam 21 (the value corresponding to Pc in FIG. 3) can be fixed at a specific value.

In the other method, without adding such mechanism, in a simple construction, the knife edge shaped plate 13 is adjusted at the time of assembling, and fixed in this state. For example, the knife edge shaped plate 13 is composed of a leaf spring, and the height of the knife edge portion 13a in the sub-scanning direction may be adjusted by a screw.

Thus, according to embodiment 2, the beam at the knife edge shaped plate for adjusting the beam pitch in the sub-scanning direction which is a major problem in the scanning optical apparatus for scanning two beams at the same time can be shaped into a beam size and shape suited to adjustment, and hence it provides a multi-beam scanning optical apparatus enhanced in adjustment precision, space saving effect, SIN ratio of sensor output, and assembling performance.

The focusing lens 37 is not limited to embodiment 2 alone, but may be applied also in the multi-beam scanning optical apparatus in embodiment 1, and the same effects as in embodiment 2 are expected.

What is claimed:

1. A multi-beam scanning optical apparatus comprising first and second light sources for emitting beams, first and second drive circuits for driving said light sources independently to emit beams, first and second collimator lenses disposed corresponding to each beam emitted from said first and second light sources for transforming said each beam into parallel light, first and second cylindrical lenses disposed corresponding to each beam emitted from said collimator lenses for focusing said each beam in a subscanning direction, optical path correcting means for moving the second cylindrical lens in the sub-scanning direction for correcting an optical path of the second beam, a beam splitter for nearly matching optical axes of the first and second beams emitted from said cylindrical lenses, a deflector having one or more deflecting surfaces near a focusing point of the cylindrical lenses for deflecting the beams, a scanning lens system for focusing the first and second beams deflected by said deflector on a scanning surface, a synchronism detector for detecting the timing of each beam for synchronizing said first and second beams and respective print signals in a main scanning direction, a sensor unit disposed on an optical path of first or second beam emitted from said beam splitter in a different direction from said deflecting surface for detecting an output level of the beam, a knife edge shaped plate disposed between said beam splitter and said sensor unit and disposed at a position optically equivalent to said deflecting surface, and an optical path correcting means control circuit for calculating a set target value of the sensor output of the second beam calculated from the sensor output level of said first beam and each sensor output characteristic data of the first and second beam measured preliminarily, and controlling said optical path correcting means by said calculated value.

2. A multi-beam scanning optical apparatus of claim 1, wherein said optical path correcting means control circuit controls said optical path correcting means so that the output level of said second beam may be the set target value of a beam pitch selected from plural set target values being set corresponding to plural beam pitches.

3. A multi-beam scanning optical apparatus comprising first and second light sources for emitting beams, first and second drive circuits for driving said light sources independently to emit beams, first and second collimator lenses disposed corresponding to each beam emitted from said first and, second light sources for transforming said each beam into parallel light, first and second cylindrical lenses disposed corresponding to each beam emitted from said collimator lenses for focusing said each beam in a sub-scanning direction, optical path correcting means for moving the second cylindrical lens in the sub-scanning direction for correcting an optical path of the second beam, a beam splitter for nearly matching optical axes of the first and second beams emitted from said cylindrical lenses, a deflector having one or more deflecting surfaces near a focusing point of the cylindrical lenses for deflecting the first and second beams, a scanning lens system for focusing the first and second beams deflected by said deflector on a scanning surface, a synchronism detector for detecting the timing of each beam for synchronizing said first and second beams and respective print signals in a main scanning direction, a line shaped position sensor disposed on an optical path of the beams emitted from said splitter in a different direction from said deflecting surface, at a position optically equivalent to said deflecting surface, at an inclination to the sub-scanning direction of the beams, for detecting a position of each of the incident beams, and an optical path correcting means control circuit for controlling said optical path correcting means by using values corresponding to the detected positions of the first and second beams by said position sensor.

4. A multi-beam scanning optical apparatus comprising first and second light sources, first and second drive circuits for driving said two light sources independently, first and second collimator lenses for transforming each beam emitted from said two light sources nearly into parallel light, first and second cylindrical lenses for focusing first and second beams emitted from said collimator lenses each in a sub-scanning direction only, a beam splitter for nearly matching optical axes of said two beams, a deflector having one or more deflecting surfaces for deflecting said two beams, and disposing near the focusing point of the cylindrical lenses, a scanning lens system for focusing the beams deflected by said deflector on a scanning surface, a synchronism detector for detecting the timing of each beam for synchronizing said first and second beams and respective print signals in a main scanning direction, optical path correcting means for moving the second cylindrical lens in the sub-scanning direction and correcting the optical path of the second beam, a sensor unit for receiving the beam emitted from said beam splitter in a different direction from said deflecting surface, a knife edge shaped plate disposed between said beam splitter and said sensor unit and disposed at a position optically equivalent to said deflecting surface, a focusing lens disposed between said beam splitter and said sensor unit, and an optical path correcting means control circuit for controlling said optical path correcting means by an output of said sensor unit.

5. A multi-beam scanning optical apparatus of claim 4, wherein said focusing lens is a cylindrical lens for focusing in the main scanning direction.

6. A multi-beam scanning optical apparatus of claim 4, wherein said focusing lens is a lens for focusing in the main scanning direction and sub-scanning direction.

7. A multi-beam scanning optical apparatus of claim 4, wherein said focusing lens is a cylindrical lens for focusing in the main scanning direction, and is rotatable about a center of the optical axis.

8. A multi-beam scanning optical apparatus of any one of claims 4 to 7, wherein said knife edge shaped plate is composed so as to be movable in the sub-scanning direction.

* * * * *